(12) United States Patent
Ichiryu

(10) Patent No.: US 6,435,831 B1
(45) Date of Patent: Aug. 20, 2002

(54) GAS-TURBINE ROTOR

(75) Inventor: Taku Ichiryu, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/575,464

(22) Filed: May 22, 2000

(30) Foreign Application Priority Data

Jun. 16, 1999 (JP) ............................................. 11-169904

(51) Int. Cl.⁷ .............................................. F04D 29/00
(52) U.S. Cl. ................................ 416/198 A; 416/204 A
(58) Field of Search ........................... 416/198 A, 204 A

(56) References Cited

U.S. PATENT DOCUMENTS

| | | | | |
|---|---|---|---|---|
| 4,496,259 A | * | 1/1985 | Foucher | 403/14 |
| 4,507,052 A | * | 3/1985 | Thompson | 415/173.7 |
| 4,682,934 A | * | 7/1987 | Knorowski et al. | 416/198 A |
| 5,031,400 A | * | 7/1991 | Boyd | 416/198 A |
| 5,628,621 A | * | 5/1997 | Toborg | 416/198 A |

\* cited by examiner

*Primary Examiner*—John Kwon
(74) *Attorney, Agent, or Firm*—Foley & Lardner

(57) ABSTRACT

The gas-turbine rotor is composed of a plurality of rotor disks which are placed one next to another in the axial direction thereof and fastened by spindle bolts piercing through all the rotor disks in the axial direction. Each of the rotor disks has annular protrusions on both sides and are joined to the adjoining rotor disks by abutting the top faces of the annular protrusions against the annular protrusions of the adjoining rotor disks. Grooves having semicircular cross sections are formed on the top face of each of the annular protrusions. When the rotor is assembled, the grooves of the adjoining rotor disks join and form circular holes. Cylindrical torque pins having flanges at both ends are fitted into the circular holes formed by the grooves. The surfaces of the inner side walls of the annular protrusions are formed as spherical surfaces. The faces of the flanges of the torque pins which contact the inner side walls are formed as spherical shapes matching the curvature of the spherical surfaces of the inner side walls.

7 Claims, 5 Drawing Sheets

GAS-TURBINE ROTOR

BACKGROUND OF THE INVENTION

1. Field of the Invention

The present invention relates to a gas-turbine rotor. More specifically, the present invention relates to a gas-turbine rotor constructed by assembling a plurality of rotor discs.

2. Description of the Related Art

In a gas turbine, high pressure, high temperature combustion gas generated by burning fuel in high pressure combustion air is used for driving a turbine through which the energy of the combustion gas is converted into a mechanical output. Usually, combustion air is supplied by an axial-flow compressor driven by the turbine. Thus, usually the rotors of the axial-flow compressor and the output turbine are combined together to form an integral gas-turbine rotor. Further, the axial-flow compressor portion of the gas-turbine rotor is usually constructed by placing a number of rotor disks one next to another and by fastening the rotors in the axial direction using through bolts. Rotor blades of the axial-flow compressor are embedded on the outer peripheries of the respective rotor disks. In other words, an assembled gas-turbine rotor is used in the gas turbine.

FIG. 7 illustrates a general construction of an assembled rotor of a gas turbine. In FIG. 7, a gas-turbine rotor 1 is composed of a turbine rotor assembly 20 which generates rotary mechanical power from the flow of combustion gas and a compressor rotor assembly 10 connected to, and driven by, the turbine rotor assembly 20 through an intermediate shaft 25. The gas-turbine rotor 1 in FIG. 7 is a "cold end drive type" in which rotary mechanical power for driving an external load is taken from the compressor rotor assembly side end 15.

As can be seen from FIG. 7, both of the turbine rotor 20 and compressor rotor 10 are composed of rotor disks. The rotor disks are placed one next to another in the axial direction and fastened together by through bolts. For example, in the compressor rotor 10, rotor disks 50 having compressor rotor blades embedded on the outer peripheries thereof are placed one next to another in the axial direction, and all the rotor disks 50 are fixed together by spindle bolts 51 piercing through the rotor disks 50 in the axial direction.

As explained later, on the side faces of the respective rotor disks 50, at the portions where the rotor disk abuts to adjoining rotor disk, grooves 33 having semicircular cross sections are formed in the radial direction. When the adjoining rotor disks are assembled together in such a manner that the grooves 33 of both rotor disks align, the pairs of semicircular grooves form circular holes 35 extending in radial directions. As explained later, torque pins 40 are inserted into the circular holes 35.

FIG. 8 is a perspective view illustrating the grooves 33 and torque pins 40 of the compressor rotor disk 50 in detail. As can be seen from FIG. 8, an annular protrusion 53 concentric with the center of the rotor disk is formed on each of the side faces 50a of the rotor disc 50. The annular protrusion 53 has a generally rectangular cross section. The inner periphery (i.e., the inner side wall) 53a and the outer periphery (i.e., the outer side wall) 53b of the annular protrusion 53 are formed as cylindrical surfaces concentric with the center of the rotor disk 50. The top face 53c of the annular protrusion is formed a flat plane perpendicular to the center axis of the rotor disk 50.

When the rotor disks 50 are assembled, the top face 53c of the annular protrusion 53 of the rotor disk 50 abuts the top face 53c of the annular protrusion of the adjoining rotor disk. Thus, the top faces 53c of the annular protrusions 53 of the adjoining rotor disks closely contact to each other when the spindle bolts 51 are fastened. 51a in FIG. 8 designates bolt holes piercing through the respective rotor disks 50 for receiving the spindle bolts 51.

As shown in FIG. 8, grooves 33 having semicircular cross sections are formed on the respective top faces 53a and extending in the radial direction. The grooves 33, together with the grooves 33 on the top face 53a of the annular protrusion 53 of the adjoining rotor disk, form circular torque pin holes 35 which penetrate the annular protrusions 53 in the radial direction when the annular protrusions of the adjoining rotor disks are joined.

When the rotor disks 50 are assembled, a cylindrical pin (a torque pin) 40 is fitted into each of the torque pin holes 35. The torque pins 40 function as keys for transmitting rotation torque between the adjoining rotor disks 50 and prevents relative angular movement between the rotor disks.

As can be seen from FIG. 7, since the number of the rotor disks 50 (i.e., the compression stages) of the compressor rotor assembly 10 is larger than the number of the rotor disks of the turbine assembly 20, the axial length of the compressor rotor assembly 10 is larger than that of the turbine rotor assembly 20. Further, in the cold end drive type gas-turbine rotor in FIG. 7, rotary torque is transmitted to an external load (such as a generator) from the turbine rotor assembly 20 via the compressor rotor assembly 10. Therefore, the torque required for driving the external load, in addition to the torque required for driving compressor assembly 10, must be transmitted from one rotor disk to the adjoining rotor disk during the operation of the gas turbine.

Further, a relatively steep temperature gradient along the axial direction is generated in the compressor rotor assembly during the operation of gas turbine. This causes the radial clearances of the bolt holes 51a relative to the spindle bolts 51 to change in accordance with the temperature gradient. Therefore, the radial clearances of the bolt holes 51a relative to the spindle bolts are different in the respective rotor disks 50. Thus, though the spindle bolts 51 fasten the rotor disks 50 to each other in the axial direction, they cannot transmit a large torque between the rotor disks. Therefore, torque pins 40 are required for transmitting torque between the rotor disks.

During the operation of the gas turbine, centrifugal force due to the rotation of the gas-turbine rotor is exerted on the torque pins 40. In order to prevent the torque pins 40 from coming out from the torque pin holes 35 due to the centrifugal force, a stopper flange 40a is formed on each of the torque pins 40 at the inner end thereof (i.e., the end of the torque pin located nearer the center of the rotor disk). Further, in order to prevent the torque pins 40 from falling out from the torque pin holes 35 due to their own weight when the gas-turbine rotor is at rest, another flange 40b is formed on each of the torque pins 40 at the outer end thereof (i.e., the end of the torque pin located far from the center of the rotor disk).

Usually, the stopper flange 40a is formed as a disk plate having flat faces on both sides thereof while the inner side wall 53a is formed as a cylindrical surface. Therefore, in order to ensure uniform contact between the flanges 40a and the inner side wall 53a when the centrifugal force is exerted on the torque pins 40, the inner face 53a of the annular protrusion 53 must be machined flat, i.e., spot facing must be formed on the surface of the inner side walls 53a at the portion around the torque pin holes 35 where the flanges 40a contact the inner face.

However, since the spot facings must be formed on the inner side walls 53a of both annular protrusions 53 of the adjoining rotor disks continuously, the machining of the spot facings requires elaborate machining work.

In order to ensure uniform contact between the stopper flange 40a and both inner side walls 53a of adjoining rotor disks, the accuracy of the machining of the spot facings must be high. In order to obtain a high accuracy of the machining, the inner side walls 53a of the adjoining rotor disks must be machined to form spot facings in the condition where two adjoining rotor disks are assembled. However, when two rotor disks are assembled, i.e., when the two rotors are joined by abutting the top faces 53c of the annular protrusions 53 against each other, the inner side walls 53a of the annular protrusions are located inside of the annular protrusions 53. Therefore, the following steps are required for machining the inner side walls 53a in order to form spot facings around the torque pin holes 35.

a) Placing an L-shaped bit used for machining the spot facing in the groove 33 of one of the rotor disks before the two rotor disks are joined.

b) Assembling the two rotor disks so that the grooves 33 of both rotor disks align and that the L-shaped bit penetrates the torque pin hole 35 formed by the grooves with the cutting bit portion of the L-shaped bit being placed inside of the annular protrusions of both rotor disks.

c) Turning the L-shaped bit while keeping the two rotor disks 50 are assembled in order to form a circular spot facing around the torque pin hole 35.

d) Disassembling the rotor disks 50 in order to remove the L-shaped bit after completing the machining of the spot facing.

The above steps a) to d) must be repeated for all of the torque pin holes 35. Usually, 10 to 20 torque pin holes 35 are required for one rotor disk and one compressor rotor assembly consists of 10 to 20 rotor disks. Therefore, the steps a) to d) must be repeated as many as 400 times before completing the machining of the spot facings of a whole compressor rotor. This increases the cost and the time required for manufacturing the gas-turbine rotor.

If the spot facing on the inner side wall 53a can be machined without assembling the rotor disks, theoretically, a large part of the above-mentioned problem may be solved. However, if the spot facing machining is carried out without joining two rotor disks, the L-shaped bit must be turned in the semicircular groove 33. This causes intermittent cutting, i.e., the L-shaped bit cuts the metal only during its half turn and races during the remaining half turn. This causes the bit to hit the edge of the inner side wall 53a every time it turns. In this case, therefore, the cutting speed is restricted to a significantly low level in order to prevent damage of the L-shaped bit. Thus, the time required for machining is not largely reduced.

SUMMARY OF THE INVENTION

In view of the problems in the related art as set forth above, the object of the present invention is to provide a means for largely reducing the time and cost required for manufacturing the gas-turbine rotor while ensuring uniform contact between the flanges of the torque pins and the inner side walls of the annular protrusions of the rotor disks.

The object as set forth above is achieved by a gas-turbine rotor, according to one aspect of the present invention, which includes a rotor assembly fabricated of a plurality of rotor disks, placed one next to another in the axial direction thereof and a plurality of spindle bolts piercing through the rotor disks and fastening the rotor disks to each other in the axial direction, comprising annular protrusions formed on both sides of each of the rotor disks and concentric with the center thereof, the annular protrusions having inner side walls facing the center of the rotor disk and outer side walls facing opposite the inner side walls and flat top surfaces, the rotor disks abutting against each other by contacting the top faces of the annular protrusions to the top faces of the annular protrusions of adjoining rotor disks, a plurality of grooves having semicircular cross sections formed on the top faces and extending in the radial direction of the rotor disk, the semicircular grooves, together with the grooves on the adjoining rotor disks, forming circular holes piercing through the annular protrusions when the rotor disks are assembled, cylindrical pins one each fitted into the respective circular holes for transmitting rotational torque between the rotor disks, each of the cylindrical pins being provided with a flange at least on the end thereof located near the center of the rotor disk, wherein, the surface of the inner side wall of an annular protrusion is formed as a spherical surface having the center thereof on the central axis of the rotor disk, and the surface of the face of the flange of the cylindrical pin abutting the inner side wall of the annular protrusion is formed as a spherical surface matching the spherical surface of the inner side wall of the annular protrusion.

According to this aspect of the invention, the surfaces of the inner walls of the annular protrusions are formed as spherical surfaces instead of cylindrical surfaces. Further, the faces of the flanges of the cylindrical pins contacting the inner side walls are also formed as spherical surfaces matching the spherical surfaces of the inner side walls. Therefore, the faces of the flanges of the pin uniformly contact the inner side walls of the annular protrusions when the centrifugal force is exerted on the pins without the need for forming the spot facings on the inner side wall surfaces.

Further, since the spherical surfaces of the inner side walls of the annular protrusions can be machined easily and accurately without assembling the rotor disks, time and cost required for manufacturing the gas-turbine rotor can be greatly reduced.

According to another aspect of the present invention, there is provided a gas-turbine rotor including a rotor assembly fabricated of a plurality of rotor disks placed one next to another in the axial direction thereof and a plurality of spindle bolts piercing through the rotor disks and fastening the rotor disks to each other in the axial direction comprising, annular protrusions formed on both sides of each of the rotor disks and concentric with the center thereof, the annular protrusions having inner side walls facing the center of the rotor disk and outer side walls facing opposite the inner side walls and flat top surfaces, the rotor disks abutting against each other by contacting the top faces of the annular protrusions to the top faces of the annular protrusions of adjoining rotor disks, a plurality of grooves having semicircular cross sections formed on the top faces and extending in the radial direction of the rotor disk, the semicircular grooves, joined by the grooves on the adjoining rotor disks, forming circular holes piercing through the annular protrusions when the rotor disks are assembled, cylindrical pins each one fitted into the respective circular holes for transmitting rotational torque between the rotor disks, each of the cylindrical pins being provided with a flange at least on the end thereof located near the center of the rotor disk, wherein the surface of the inner side wall of the annular protrusions is formed as a cylindrical surface having the center thereof on the central axis of the rotor disk, and the surface of the face of the flange of the cylindrical pin abutting the inner side wall of the annular protrusion is formed as a cylindrical surface matching the cylindrical surface of the inner side wall of the annular protrusion.

According to this aspect of the invention, the surface of the inner side wall of the annular protrusion is formed as a cylindrical surface same as in the related art. However, in this embodiment, the face of the flange of the pin contacting the inner side wall is also formed as a cylindrical surface which matches the cylindrical surface of the inner side wall. Therefore, the faces of the flanges of the pin uniformly contact the inner side walls of the annular protrusions when the centrifugal force is exerted on the pins without the need for forming the spot facings on the inner side wall surfaces.

Further, according to yet another aspect of the present invention, there is provided a gas-turbine rotor including a rotor assembly fabricated of a plurality of rotor disks placed one next to another in the axial direction thereof and a plurality of spindle bolts piercing through the rotor disks and fastening the rotor disks to each other in the axial direction comprising, annular protrusions formed on both sides of each of the rotor disks and concentric with the center thereof, the annular protrusions having inner side walls facing the center of the rotor disk and outer side walls facing opposite the inner side walls and flat top surfaces, the rotor disks abutting against each other by contacting the top faces of the annular protrusions to the top faces of the annular protrusions of adjoining rotor disks, a plurality of grooves having semicircular cross sections formed on the top faces and extending in the radial direction of the rotor disk, the semicircular grooves, together with the grooves on the adjoining rotor disks, forming circular holes piercing through the annular protrusions when the rotor disks are assembled, cylindrical pins one each fitted into the respective circular holes for transmitting rotational torque between the rotor disks, each of said cylindrical pins being provided with a flange at least on the end thereof located near the center of the rotor disk, wherein the surface of the face of the flange facing the inner side walls of the annular protrusions contacts the inner side wall of only one of the rotor disks adjoining each other.

According to this aspect of the invention, the face of the flange contacts the inner side wall of the annular protrusions of only one of rotor disks adjoining each other. When the inner side walls of the annular protrusion is machined without assembling the adjoining rotor disks, the accuracy of the machining must be relatively high so that the inner side walls of the annular protrusions of the adjoining rotor disks form a continuous surface in order to ensure uniform contact of the face of the flange and the inner side walls of the annular protrusions of the adjoining rotor disks.

However, the centrifugal force exerted on the cylindrical pin is relatively small. Therefore, if the face of the flange of the cylindrical pin uniformly contacts the inner side walls of the annular protrusions of one of the adjoining rotor disks, problems do not occur. In other words, the face of the flange does not need to contact both of the inner side walls of the annular protrusions of the adjoining rotor disks. Therefore, in this aspect of the invention, the inner side walls of the annular protrusion abutting each other have different dimensions so that only one of them contacts the face of the flange of the cylindrical pin. For example, if the surface of the inner side walls of the annular protrusions are formed as spherical or cylindrical surfaces having the center on the central axis of the rotor disks, the surface of the inner side walls of the annular protrusions which abut against each other are machined in such a manner that the diameter of one of the inner side walls becomes smaller than the diameter of the other inner side wall so that only the inner side wall having a smaller radius contacts the face of the flange of the cylindrical pin. By doing so, the accuracy of the machining of the inner side walls can be lowered even if the inner side walls are machined without joining the adjoining rotor disks and, thereby, the time and the cost required for manufacturing a rotor are further reduced.

Further, if the face of the flange contacts only one of the inner side walls, a flange having flat face may be used. In this case, the spot facings must be machined around the semicircular grooves in order to ensure uniform contact of the flat faces of the flanges and the curved inner side wall surface. However, in this case, the spot facing is required for only one of the surfaces of the inner side walls of the adjoining rotor disks. Therefore, the amount of machining work required for forming the spot facing becomes half that of the case where inner side walls of both of the adjoining rotor disks are machined to form spot facings.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the gas-turbine rotor according to the present invention will be explained with reference to FIGS. 1 through 6.

(1) First Embodiment

Figure 1:
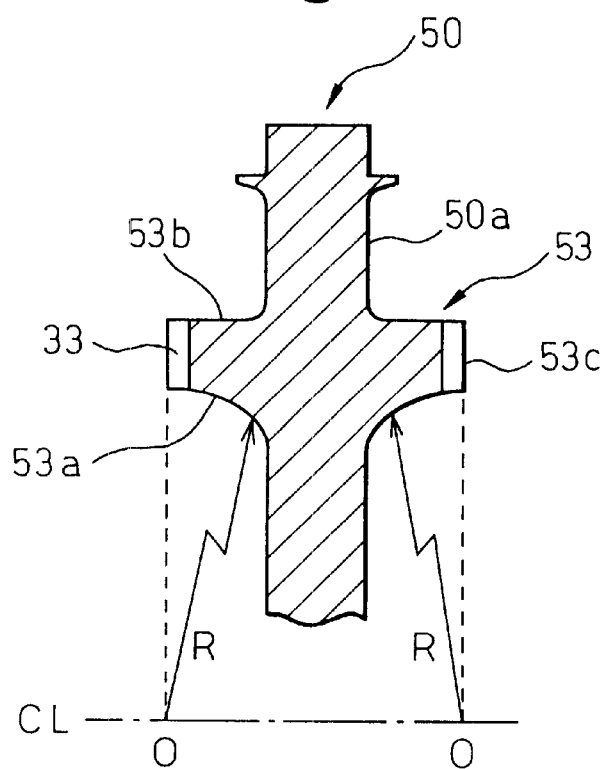
FIG. 1 is a partial sectional view of a rotor disk used in the gas-turbine rotor according to a first embodiment of the present invention.
Figure 2:
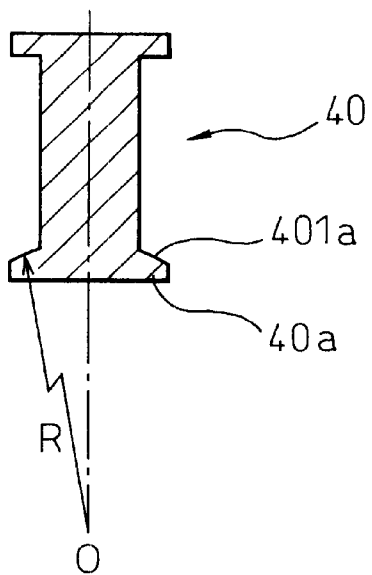
FIG. 2 is a longitudinal sectional view of a torque pin used in the first embodiment.
Figure 7:
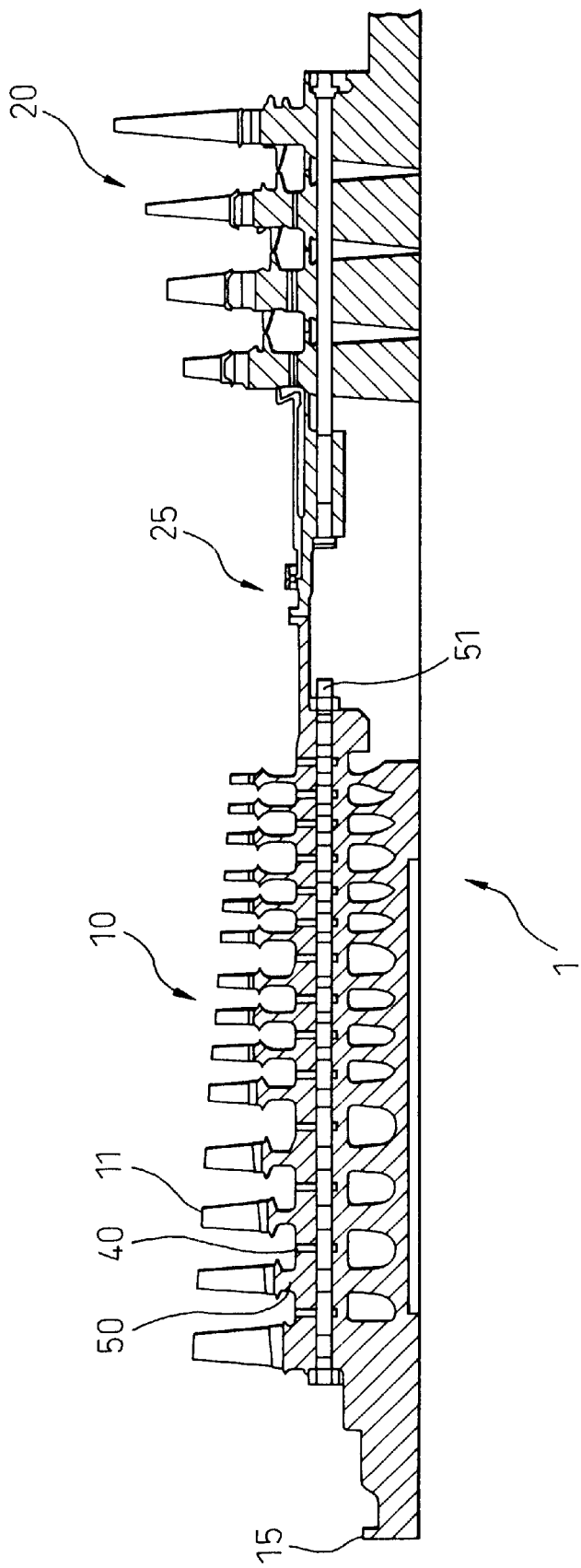
FIG. 7 is a longitudinal sectional view illustrating the construction of a conventional gas-turbine rotor.

FIGS. 1 and 2 are sectional views of a rotor disk 50 and torque pin 40, respectively, taken along a plane including the central axis of the disk according to the first embodiment of the present invention. In FIGS. 1 and 2, reference numerals the same as those in FIGS. 7 and 8 represent similar elements.

In this embodiment, annular protrusions 53 are provided on both side faces 50a of rotor disk 50. The top faces 53c of the annular protrusions 53 are formed as flat planes perpendicular to the center axis CL of the rotor disk. When the rotor disks are assembled, the top faces 53c of the adjoining rotor disks abut each other. Further, semicircular grooves 33 extending in the radial direction are formed on the top face 53c of the annular protrusion 53.

Figure 8:
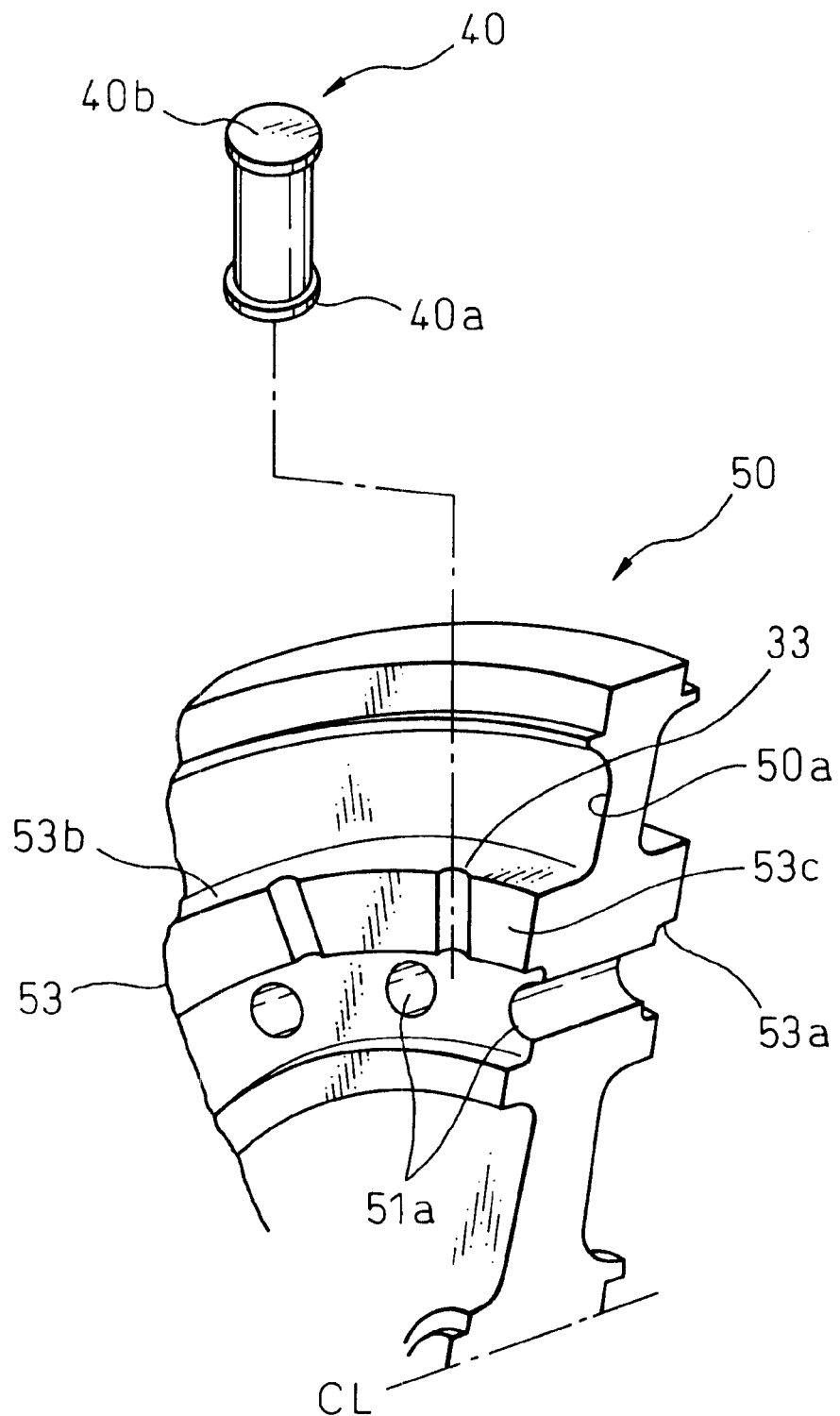
FIG. 8 is a partial perspective view showing the shape of an annular protrusion and a torque pin of the rotor disks in FIG. 7.

In the conventional rotor disk in FIG. 8, the surface of the inner side wall 53a of the annular protrusion is formed as a cylindrical surface having a central axis coinciding with the central axis (FIG. 8, CL) of the rotor disk 50. The portions of the surface of the inner side wall 53a around the grooves 33 are machined to form flat planes, i.e., spot facings are formed on the surface of the inner side wall 53a around the groove 33.

In contrast to the conventional rotor disk, the surface of the inner side wall 53a of the annular protrusion 53 is formed as a spherical surface having its center on the central axis CL of the disk 50 in this embodiment. Further, no spot facings are formed on the surface of the inner side wall 53a around the grooves 33.

In this embodiment, the center of the spherical surface of the inner side wall 53a coincides with the point where the plane of the flat top face 53c of the annular protrusion 53 intersects the central axis CL of the rotor disk 50. The radius R of the inner side wall 53a is appropriately determined in accordance with the location, thickness and height of the annular protrusion.

Further, in this embodiment, the torque pin 40 is cylindrical shape having flanges on both ends. The surface of the face 401a of the flange 40a of the torque pin which contacts the inner side wall 53a is formed as a spherical surface having a radius the same as the radius of the inner side wall 53a. The spherical surface of the face 401a has its center O on the central axis of the cylindrical pin 40. Therefore, when the torque pin 40 is fitted into the radial semicircular groove 33, the curvature of the face 401a of the flange 40a matches the curvature of the inner side wall 53a and, thereby, the face 401a uniformly contacts the inner side wall 53a.

Since the surface of the inner side wall 53a of the annular protrusion 53 is formed as a spherical surface having its center on the central axis of the rotor disk 50, the inner side wall 53a can be easily machined with high accuracy without assembling the adjoining rotors. Namely, the inner side wall 53a can be machined to a desired spherical shape by turning the rotor disk 50 around the central axis thereof while abutting the cutting bit against the inner side wall 53a in the radial direction. The face 401a of the flange 40a of the torque pin 40 also can be machined in a desired spherical shape easily and accurately in the manner similar to the inner side wall 53a.

Therefore, according to the present embodiment, uniform contact between the flange face 401a and the inner side wall 53a is possible without forming the spot facing on the inner side wall 53a. Thus, the time and the cost required for machining a large number of spot facings on the inner side wall 53a are not required in this embodiment and, thereby the time and the cost required for manufacturing the gas-turbine rotor can be greatly reduced.

In this embodiment, the surface of the face 401a of the flange 40a is formed as a spherical surface so that the whole area of the face 401a uniformly contacts the inner side wall 53a. However, since the centrifugal force exerted on the torque pin 40 during the operation of the gas turbine is relatively small, the face 401a may be machined in a conical shape instead of a spherical shape so that the flange face 401a contacts the inner side wall 53a only at its outer periphery.

Further, though the flange face 401a preferably uniformly contacts the inner side walls 53a of the annular protrusions 53 of both of the adjoining rotor disks 50 when the rotor disks are assembled, practically, problems do not occur even if the flange face 401a contacts the inner side wall 53a of one of the annular protrusions 53 as long as the contact is uniform. Therefore, the inner side walls 53a of the adjoining rotor disks 50 do not necessarily form one continuous spherical surface when the annular protrusions 53 of adjoining rotors are joined. In other words, even if the two inner side walls 53a are not flush when the two annular protrusions 53 are joined, practically, no problems occur as long as the flange face 401a contacts one of the inner side walls 53a uniformly.

(2) Second Embodiment

Next, a second embodiment of the present invention is explained with reference to FIGS. 3 and 4.

Figure 3:
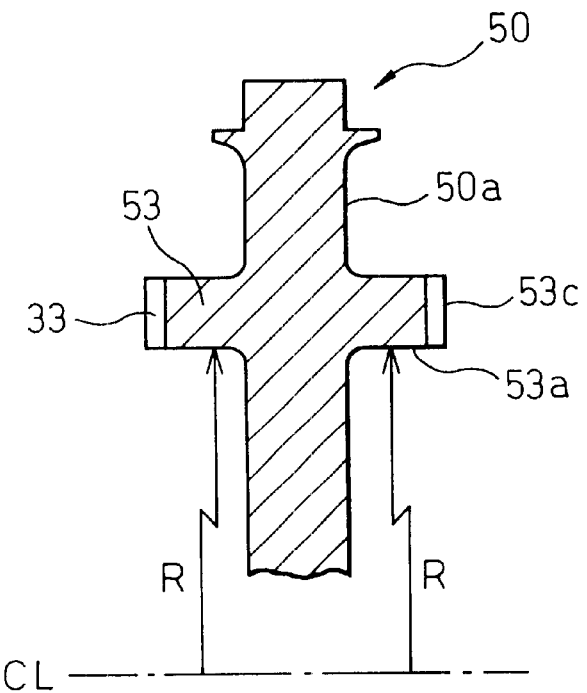
FIG. 3 is a partial sectional view of a rotor disk used in the gas-turbine rotor according to a second embodiment of the present invention.

FIG. 3 is a partial sectional view of the rotor disk 50 of the present embodiment, similar to FIG. 1. In this embodiment, similarly to the conventional rotor disk in FIG. 8, the inner side walls 53a of the annular protrusions 53 of the rotor disk 50 are formed as cylindrical surfaces having a radius R and concentric with the rotor disk 50. However, spot facings are not formed on the inner side walls 53a around the radial semicircular grooves 33.

Figure 4A:
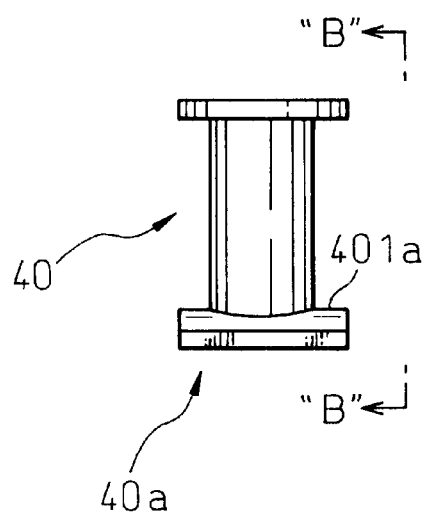
FIG. 4A is a side view of a torque pin used in the second embodiment.
Figure 4B:
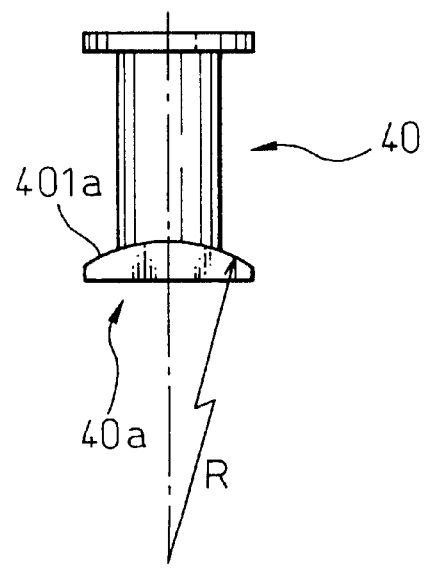
FIG. 4B is a view taken from the direction B—B in FIG. 4A.

FIG. 4A is a side view of the cylindrical torque pin 40 used in this embodiment and FIG. 4B is view of the same seeing from the direction B—B in FIG. 4A. As can be seen from FIGS. 4A and 4B, the surface of the flange face 401a of the flange 40a of the torque pin 40 is formed as a cylindrical surface having a radius R, the same as the radius of the inner side wall 53a. Therefore, in this embodiment, since the flange face 401a matches the inner side walls 53a of the annular protrusions 53 when the adjoining rotor disks 50 are joined, the flange face 401a uniformly contacts with the inner side walls 53a of the adjoining rotor disks without the need for forming the spot facings on the inner side walls 53a around the grooves 33.

In this embodiment, the inner side wall 53a of the annular protrusion 53 can be machined in a manner the same as that of the conventional rotor disk in FIG. 8. However, since the machining of the spot facings on the inner side wall 53 is not required, elaborate machining works in the condition where the two adjoining rotor disks are assembled is not required. It is true that relatively complicated machining work is required for forming cylindrical surfaces on the flange faces 401a of the torque pins 40. However, since the torque pin 40 is much smaller than the rotor disk 50, the time and the cost required for machining the flange faces 401a is much smaller than time and cost required for forming spot facings on the inner side walls 53a of the rotor disk. Therefore, according to the present embodiment, the time and the cost required for manufacturing the gas-turbine rotor is greatly reduced as a whole.

(3) Third Embodiment

Figure 5:
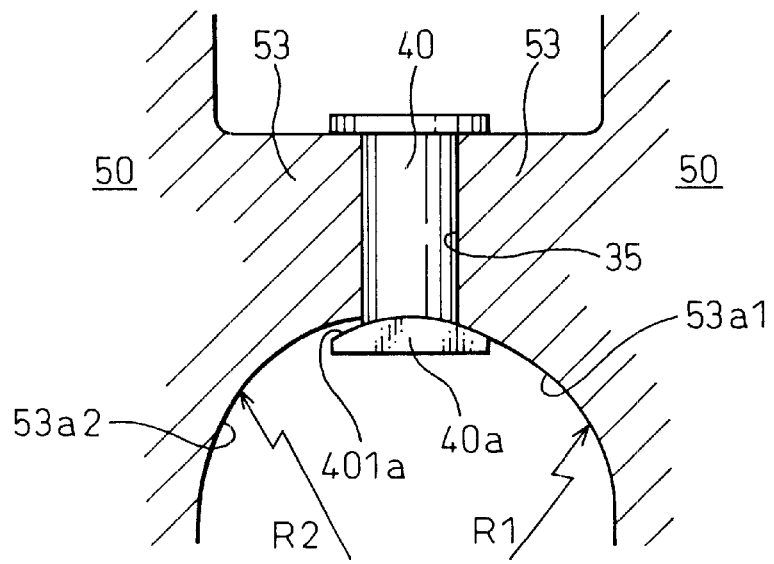
FIG. 5 is a partial schematic sectional view of rotor disks, according to a third embodiment of the present invention, adjoining each other when the rotor disks are assembled.

Next, a third embodiment of the present invention will be explained with reference to FIG. 5. FIG. 5 is a schematic sectional view of the rotor disks 50 in the assembled condition. In FIG. 5, two adjoining rotor disks 50 are joined by abutting the top faces 53c (not shown) of the annular protrusions 53 to each other. In this condition, the radial semicircular grooves (33 in FIG. 1) on both annular protrusions 53 join each other and form a circular torque pin holes 35. In FIG. 5, the surfaces of the inner side walls (53a in FIG. 1) of the annular protrusions 53 are formed as spherical surfaces having their centers on the central axis of the rotor disks 50.

However, though the inner side walls of both adjoining rotor disks have spherical surfaces, the radius R1 of the spherical surface of the inner side wall 53a1 of one of the adjoining rotor disks is smaller than the radius R2 of the spherical surface of the inner side wall 53a2 of the other of the adjoining rotor disks in this embodiment. The surface of the flange face 401a of the torque pin 40 is formed as a spherical surface having a radius R1, the same as the smaller radius R1 of the inner side wall 53a1. Therefore, as shown in FIG. 5, the flange face 401a of the torque pin 40 only contacts the inner side wall 53a1 having a radius R1 when the rotor disks are assembled. In other words, the centrifugal force exerted on the torque pin 40 during the operation of the gas turbine is received by the contact only between the flange face 401a and the inner side wall 53a1.

As explained before, since the centrifugal force exerting on the torque pin 40 is relatively small, practically no problems occur even if the flange face 401a of the flange 40 contacts only one of the inner side wall (53a1) as long as the flange face 401a uniformly contacts the inner side wall 53a1.

Therefore, in this embodiment, the radius of the inner side wall of one of the adjoining rotor disk is intentionally set at a value smaller than the radius of the inner side wall of the other of the adjoining rotor disk so that only one of the inner side wall contacts the flange face 401a when the adjoining rotor disks are assembled. When the inner side walls of the rotor disks are machined without assembling the adjoining rotor disks, a relatively high accuracy of machining is required if the surfaces of the inner side walls of the rotors adjoining each other must be joined continuously (i.e., without forming a step at the seam of two surfaces). Therefore, in this embodiment, by intentionally forming a step at the seam of inner side walls of the adjoining rotors, the accuracy of the machining of the inner side walls can be lowered to some extent while maintaining the uniform contact between the flange face 401a and one of the inner side walls. Thus, according to this embodiment, the time and the cost required for manufacturing the gas turbine can be further reduced.

Though the present embodiment is explained with reference to the example in which the surfaces of the inner side walls 53a are formed as spherical surfaces, the surface of the inner side walls 53a may be formed as cylindrical surfaces. In this case, if the radius of the surface of the inner side wall of one of the adjoining rotor disks is set at a smaller value than the inner side wall of the other of the adjoining rotor disks, the same advantageous effect can be obtained.

(4) Fourth Embodiment

Figure 6:
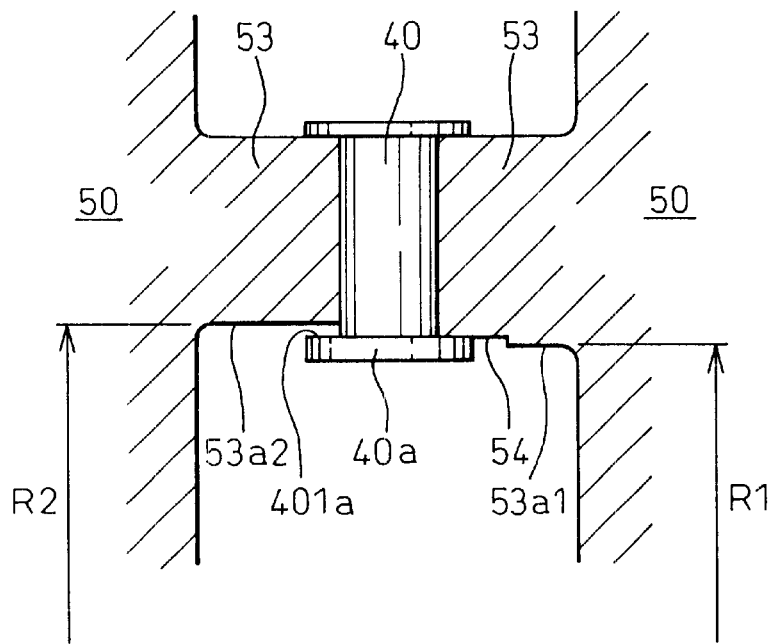
FIG. 6 is a partial schematic sectional view of rotor disks, according to a fourth embodiment of the present invention, adjoining each other when the rotor disks are assembled.

FIG. 6 is a partial section view similar to FIG. 5 which illustrates a fourth embodiment of the present invention.

In this embodiment, the surface of the inner side walls 53a of the annular protrusions 53 of the rotor disks 50 are formed as cylindrical surfaces concentric with the rotor disks. Further, similarly to the third embodiment, the radius R1 of the inner side wall 53a1 of one of the adjoining rotor disks is smaller than the radius R2 of the inner side wall 53a2 of the other of the adjoining rotor disks. Therefore, also in this embodiment, the flange face 401a of the torque pin 40 only contacts the inner side wall 53a1 having a smaller radius R1.

However, the surface of the flange face 401a of the torque pin 40 is formed as a flat plane in this embodiment.

Therefore, a spot facing 54 (a flat surface) is formed on the surface of the inner side wall 53a1 in order to obtain uniform contact between the flange face 401a and the inner side wall 53a1. However, the spot facing 54 is formed only on the surface of the inner side wall 53a1 having a smaller radius R1. Further, the depth of the spot facing 54 is determined in such a manner that the flange face 401a does not contact the inner side wall 53a2 having a larger radius R2 when the flange face 401a contacts the bottom plane of the spot facing 54. In this embodiment, a torque pin 40 having a flat flange face 401a can be used by forming a spot facing 54 on the inner side wall 53a1 which contacts the flange face 401a. Therefore, according to this embodiment, a uniform contact between the flange face 401a and the inner side wall 53a1 can be obtained although a torque pin 40 having a flat flange face 401a is used.

It is true that the machining of the inner side wall 53a1 is required for forming the spot facings 54 in this embodiment. However, the machining of the spot facings are required for only one of the inner side walls adjoining each other and the machining can be carried out without assembling the adjoining rotor disks. Further, since the number of the spot facings to be machined is a half of that in the conventional rotor disk in FIG. 8, the time and the cost required for the machining of the spot facings are largely reduced although the cutting speed of the bit must be lowered when the spot facings are machined without assembling the adjoining rotor disks. Thus, the time and the cost required for manufacturing the gas-turbine rotor can be greatly reduced.

What is claimed is:

1. A gas-turbine rotor including a rotor assembly, fabricated of a plurality of rotor disks placed one next to another in the axial direction thereof and a plurality of spindle bolts piercing through the rotor disks and fastening the rotor disks to each other in the axial direction, comprising:

annual protrusions formed on both sides of each of the rotor disks and concentric with the center thereof, said annular protrusions having inner side walls facing the center of the rotor disk, outer side walls facing the opposite inner side walls and flat top surfaces, said rotor disks abutting against each other by contacting the top faces of the annular protrusions with the top faces of the annular protrusions of adjoining rotor disks;

a plurality of grooves having semicircular cross sections formed on the top faces and extending in the radial direction of the rotor disk, said semicircular grooves, joined by the grooves on the adjoining rotor disks, forming circular holes piercing through the annular protrusions when the rotor disks are assembled;

cylindrical pins, one each fitted into said respective circular holes for transmitting rotational torque between the rotor disks, each of said cylindrical pins being provided with a flange at least on the end thereof located near the center of the rotor disk;

wherein, the surface of the inner side wall of at least one of the annular protrusions of any two abutting rotor disks contacts the surface of the face of the flange facing the inner side walls of the annular protrusions, the surface of the inner side wall of the annular protrusion contacting the surface of the flange comprising a surface selected from the group consisting of a spherical surface and a cylindrical surface having the center thereof on the central axis of the rotor disk, and wherein, the surface of the face of the flange of each of the cylindrical pins that contact the inner side wall of the annular protrusion is formed as a surface selected from the group consisting of a spherical surface and a cylindrical surface to match the contacting surface of the inner side wall of the contacting annular protrusion.

2. The gas-turbine rotor of claim 1, wherein the surface of the inner side wall of both the annular protrusions on each rotor disk contacts the surface of the face of the flange facing the inner side walls of the annular protrusions.

3. The gas-turbine rotor of claim 1, wherein the surface of the inner side wall of only one of the annular protrusions on each rotor disk contacts the surface of the face of the flange facing the inner side walls of the annular protrusions.

4. The gas-turbine rotor of claim 1, wherein the surface of the inner side wall of the annular protrusion is formed, at least in part, as a spherical surface and side wall of the annular protrusion is formed as a spherical surface matching the spherical surface of the inner side wall of the annular protrusion.

5. The gas-turbine rotor of claim 1, wherein the surface of the inner side wall of the annular protrusion is formed, at least in part, as a cylindrical surface and wherein the surface of the face of the flange of the cylindrical pins abutting the inner side wall of the annular protrusion is formed as a cylindrical surface matching the cylindrical surface of the inner side wall of the annular protrusion.

6. The gas-turbine rotor of claim 1, wherein the surface of the inner side wall of the annular protrusion is formed, at least in part, as a cylindrical surface and wherein the surface of the face of the flange of the cylindrical pins abutting the inner side wall of the annular protrusion is formed as a spherical surface matching the cylindrical surface of the inner side wall of the annular protrusion.

7. The gas-turbine rotor of claim 1, wherein the surface of the inner side wall of both the annular protrusions on each rotor disk contacts the surface of the face of the flange facing the inner side walls of the annular protrusions, and wherein the surface of the inner side wall of the annular protrusion is formed, at least in part, as a spherical surface and wherein the surface of the face of the flange of the cylindrical pins abutting the inner side wall of the annular protrusion is formed as a spherical surface matching the spherical surface of the inner side wall of the annular protrusion.

* * * * *